Patented Dec. 19, 1939

2,183,860

UNITED STATES PATENT OFFICE 2,183,860

PROCESS FOR THE PRODUCTION OF ALKENE SULPHIDES

Willem Coltof, Amsterdam, Netherlands, assignor to Shell Development Company, San Francisco, Calif., a corporation of Delaware No Drawing. Application February 6, 1939, Serial No. 254,783. In the Netherlands February 16, 1938

4 Claims. (Cl. 260—327)

This invention relates to a new and improved process for the production of alkene sulphides and derivatives thereof.

Ethylene sulphide, the lowest and most important member of the alkene sulphides, has the structure

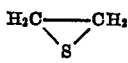

and may be considered as the sulphur analogue of ethylene oxide. Although ethylene oxide was prepared long ago, all attempts to produce the corresponding ethylene sulphide by similar reactions yielded a material which, although at first believed to be ethylene sulphide, was soon found to be diethylene disulphide (1.4.dithiane)

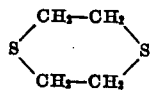

and other bodies of high molecular weight. In fact, even as late as 1923, in one of the foremost authoritative works on organic chemistry (Richter's Organic Chemistry—D'Albe vol. III, p. 9), it is stated "ethylene sulphide,

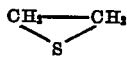

corresponding to ethylene oxide, is apparently not capable of existing. It is usually its polymerides which are obtained: $(C_2H_4S)_4$ and $(C_2H_4S)_2$ diethylene disulphide". In 1920 it was found that ethylene sulphides could, in fact, be prepared by reacting alkene dithiocyanates with sodium sulphide (Bull. Soc. Chim. Fr. (4) 27 740 (1920))

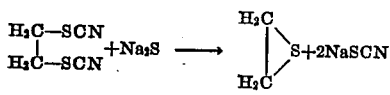

This method, while it may be suitable for laboratory preparation, is very costly. More recently, more practical and inexpensive methods were discovered (U. S. Patents 2,094,837 and 2,094,914). According to these processes ethylene sulphide is prepared by reacting ethylene oxide with potassium thiocyanate or thiourea according to the schemes:

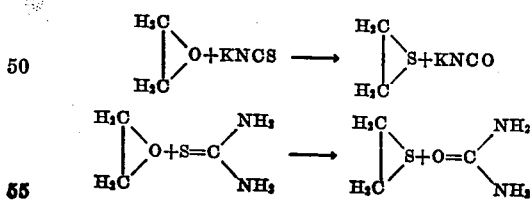

Ethylene sulphide is a very useful compound which, no doubt, will find in the future a much wider application. One of the outstanding properties of ethylene sulphide is its extraordinary insecticidal efficiency. The use of this valuable compound as an insecticide is, however, at present, practically prohibited by its high cost of production.

An object of the present invention is to provide a practical and more economical method for the production of ethylene sulphide, which has the advantages of not requiring the use of expensive thiocyanates or other expensive raw materials, and of affording superior yields. It is, furthermore, an object of the invention to provide a process for the production of ethylene sulphide, which may also be advantageously used for the production of homologues and other derivatives of ethylene sulphide.

I have found that ethylene sulphide may be prepared much more economically and in almost quantitative yields by the dehydrohalogenation of ethane halogen thiols. These compounds, which have the structure

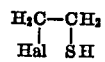

may be very easily prepared from inexpensive and available derivatives of ethylene by a number of methods. One suitable method is, for example, by reacting ethylene chlorhydrin with sodium hydrosulphide and subsequently esterifying with halogen acid. Of the various ethane halogen thiols I have found chloro ethane thiol to be very suitable.

Although the ethane halogen thiols have been known for a long time, no one has hitherto succeeded in converting those compounds into the corresponding cyclic sulphide. In such cases where these compounds have been treated with alkalies to remove hydrogen halide therefrom the reaction has invariably proceeded as in the attempts to produce ethylene sulphide from the corresponding dihalides, i. e., with the formation of insoluble high molecular weight polymers, which is due to the high alkalinity of the reaction medium. On the other hand hydrolysis of the ethane halogen thiols also produces polymeric sulphides owing to the acidity caused by the hydrogen halide formed simultaneously.

I have found that if ethane halogen thiols are dehydrohalogenated under conditions sufficiently near neutral, the formation of high molecular weight polymers is substantially avoided and the reaction proceeds in the desired direction with the formation of almost quantitative yields of ethylene sulphide. The best results, in general, may be obtained when the dehydrohalogenation is executed under neutral or preferably slightly alkaline conditions, for example within a pH range of from about 5.5 to about 11.5 and preferably from about 7.5 to about 9.5.

As suitable dehydrohalogenating agents I may, in general, employ any agent capable of neutralizing or reacting with the halogen acid, such as, for instance, any of the basic-acting metal oxides, hydroxides, carbonates, bicarbonates, borates, phosphates, basic-acting salts of strong bases and weak acids, buffer mixtures tending to create and maintain a basic condition, organic and inorganic nitrogen bases, etc. Of these various available dehydrohalogenating agents those tending, when used in excess, to maintain the preferred hydrogen ion concentration, I have found, afford, in general, the best yields and are the most convenient to use.

In such cases where the dehydrohalogenating agent tends to create and maintain a neutral or preferably slightly alkaline condition, the dehydrohalogenating agent may be used in any excess. Thus, for example, when using such dehydrohalogenating agents as sodium bicarbonate, sodium borate, sodium acetate, buffer mixtures of $Na_2HPO_4$ and $NaH_2PO_4$, and the like, which tend to maintain the conditions within the desired limits, any excess of the dehydrohalogenating agent may be used. The dehydrohalogenating agent, in such cases, may be reacted with the ethane halogen thiol in any desired manner; for example, it may be added as an aqueous solution (if it is sufficiently soluble) to the alkane halogen thiol; it may be added as a solid to a solution of the alkane halogen thiol in any suitable solvent; it may be mixed with the alkane halogen thiol and water slowly added to the mixture; the alkane halogen thiol may be slowly added to an aqueous solution of the dehydrohalogenating agent; and in some cases, the alkane halogen thiol, dehydrohalogenating agent and water may be mixed in the desired proportions and allowed to react.

In such cases where the dehydrohalogenating agent is a strong base, such as, for example, when the alkali metal hydroxides, trisodium phosphate, etc. are used, the dehydrohalogenating agent is preferably added as an aqueous solution (preferably quite dilute) to the alkane halogen thiol or solution thereof during the reaction at such a rate as to maintain the pH of the reaction mixture within the desired range.

The dehydrohalogenation reaction in general takes place readily at ordinary or room temperatures with excellent yields of ethylene sulphide. In some cases, especially when the dehydrohalogenation is executed at very close to neutrality, somewhat elevated temperatures, such as, for instance, 35-45° C., may be advantageous. The reaction may also, if desired, be executed at temperatures below room temperature. This may be of advantage in some cases in affording a somewhat better yield, especially when a strong base is used as the dehydrohalogenating agent.

Stirring or other means of insuring intimate contact of the ethane halogen thiol and the dehydrohalogenating agent, although not essential when using a weakly basic dehydrohalogenating agent, is, in general, conducive to somewhat better yields, and is of considerable importance when using strongly basic dehydrohalogenating agents.

The following examples describing the production of ethylene sulphide from chlor-1-ethane thiol-2 are submitted to illustrate suitable applications of my invention, and to show the advantageous results obtained, and are, it is to be understood, not to be construed as limiting the invention in any manner.

Example I

1½ mols of sodium bicarbonate in 100 cm.³ of water were reacted with 1 mol of chlor-1-ethane thiol-2 at 20° C. A uniform stream of carbonic acid escaped and the temperature remained practically constant. After a few hours the evolution of carbonic acid ceased and the reaction was substantially completed. The reaction mixture was then distilled under reduced pressure and the distillate collected. The distillate separated into two layers: an aqueous bottom layer, and an upper layer containing the ethylene suphide. The upper layer, if desired, may be dried over a dehydrating agent such as, for instance, $CaCl_2$.

Example II 1 mol of sodium bicarbonate (dry powder) was mixed with 1 mol of chlor-1-ethane thiol-2. To this mixture there was slowly added, with stirring, 100 cm.³ of water over a period of about two hours while the temperature was kept at about 20° C. The escaping carbonic acid was passed through a return condenser maintained at −80° C. to condense out any entrained ethylene sulphide. The evolution of carbonic acid ceased about 30 minutes after all the water had been added. After the completion of the reaction an additional 50 cm.³ of water was added to dissolve the separated NaCl. After stirring for one hour to insure completion of the reaction the upper layer was withdrawn and the lower layer distilled in vacuo. The distillate separated into two layers. The upper layer of this latter distillate was separated off and combined with the first upper layer. The combined upper layers were dried over $CaCl_2$ and refractionated. About 54 gms. of ethylene sulphide (boiling point 56° C.) were obtained. This corresponds to 90% of the theoretical yield.

Example III 6 gms. of sodium were dissolved in 150 cm.³ of absolute alcohol. Of the resulting solution 52.5% was saturated with $H_2S$ and then added to the other 47.5%. By evaporization of the alcohol in vacuo a buffer salt was obtained. 6.7 gms. of this salt were added in small portions during about two hours to 16 gms. of chlor-1-ethane thio-2 while maintaining the temperature at 5-10° C. A regular evolution of $H_2S$ took place and continued for about one hour after all the salt had been added. Ethylene sulphide which may have been entrained by the $H_2S$ was condensed by cooling to −50° C., and returned to the reaction mixture. After addition of 25 cm.³ of water, the upper layer was separated off from the reaction mixture. The lower layer was distilled in vacuo to obtain a distillate yielding a small amount of ethylene sulphide as an upper layer. The two upper layers were combined, dried over calcium chloride and refractionated. About 9 gms. of ethylene sulphide (about 90% of theoretical) was obtained.

Example IV 6.7 gms. of chemically pure NaOH was slowly added with vigorous stirring to 16 gms. of chlor-1-ethane thiol-2, maintained at 0° C. The NaOH was added over a period of about 1¼ hours in such small portions or at such a rate that the mixture remained practically neutral. The reaction mixture was stirred for an additional 2.5 hours at 0° C., and the organic liquid poured off from the wet salt mixture and distilled until the vapor temperature was about 65° C. (distillate 1). The distillation residue was again added to the salt mixture, and 25 cm.³ of water slowly added during about 15 minutes, while maintaining the temperature at 0° C. The mixture was subsequently stirred for one hour at 0° C., and for an additional hour at 20° C. The reaction mixture was then distilled in vacuo, and the organic layer separated from the distillate (distillate 2). The combined distillates (1 and 2), upon careful refractionation, yielded about 5 gms. of ethylene sulphide. This corresponds to about 50% of the theoretical yield.

As will be apparent from the foregoing description and the illustrative examples, my invention affords a very practical and economical method for the production of ethylene sulphide. According to the process of my invention ethylene sulphide may be produced at about one-half the cost of that produced by the best of the hitherto known methods.

While I have in the foregoing stressed the use of my invention for the production of ethylene sulphide, this is because ethylene sulphide, due to its strong tendency to form high molecular weight polymers, is by far the most difficult alkene sulphide to prepare, and it is consequently with the production of this compound that my invention shows the greatest advantage. The homologues of ethylene sulphide, such as propene sulphide, butene-1 sulphide, butene-2 sulphide, etc., have a considerably less tendency to polymerize, and unlike ethylene sulphide are in some cases produced in small yields by dehydrohalogenation under fairly strong basic and acidic conditions. By executing the dehydrohalogenation in nearly neutral or preferably slightly alkaline conditions, according to the process of the present invention, I have found that these higher homologues of ethylene sulphide may also be easily produced in excellent yields, and at only a fraction of their former production costs. The present process in its broader aspect may be advantageously employed for the production of alkene sulphides from any alkane halogen thiol in which the halogen atom and the thiol group are attached to vicinal carbon atoms. These suitable raw materials contain the structural grouping:

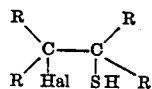

wherein Hal represents an atom of one of the halogen elements, and R represents the same or different substituents selected from the group consisting of a hydrogen atom and hydrocarbon radicals. The hydrocarbon radicals may be of aliphatic or aromatic or heterocyclic character, and may contain other substituted groups, such as hydroxyl groups, halogen atoms, etc.

As examples of a few of the preferred alkane halogen thiols which may be advantageously used may be mentioned, beside the ethane halogen thiols, compounds of the following structural formulae:

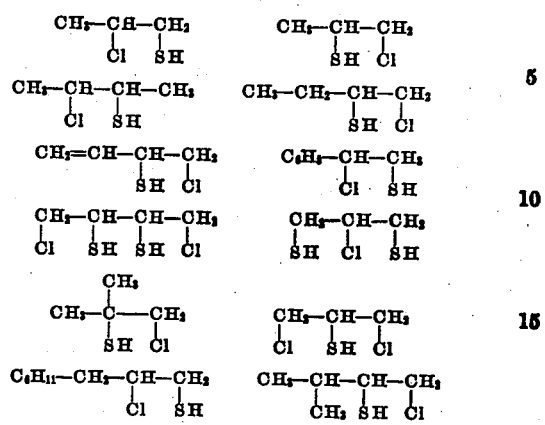

and the like.

The following example illustrates the invention as applied to the preparation of butene-2 sulphide.

Example V 26.0 gms. chlor-2 butane thiol-3 were stirred during ¾ hour with 16.8 gms. dry sodium bicarbonate. 25 gms. of water were then added slowly whilst stirring in 1¼ hours. The smooth evolution of carbonic acid which occurred, ceased after 6 hours' stirring at room temperature. The upper layer was then separated from the lower layer, wherein the salt was substantially completely dissolved, which latter layer was subsequently extracted with ether. The product was dried over calcium chloride and then fractionated under a pressure of 198 mm. The butene-2 sulphide substantially completely distilled over at 56–58° C. and was obtained in an amount of about 14 gms., corresponding to 80% of the theoretical yield.

As various modifications of my invention are possible without departing from the spirit thereof, it is to be understood that the invention is not limited to the specific embodiments herein described except as defined in the appended claims construed as broadly as permissible in view of the prior art.

I claim as my invention:

1. A process for the dehydrochlorination of 1-chloro-ethane-thiol-2 to ethylene sulphide while avoiding the substantial formation of ethylene sulphide polymers which comprises reacting the 1-chloro-ethane-thiol-2 with an alkali metal bicarbonate in an aqueous medium, the alkali metal bicarbonate being used in sufficient amount to combine with the liberated hydrogen chloride and maintain the pH of the reaction mixture in the range of from 7.5 to 9.5

2. A process for the dehydrohalogenation of a 1-halo-ethane-thiol-2 to ethylene sulphide while avoiding the substantial formation of ethylene sulphide polymers which comprises reacting the 1-halo-ethane-thiol-2 with a basic-acting agent which combines with the liberated hydrogen halide and maintains the pH of the reaction mixture in the range of from 5.5 to 11.5

3. A process for the dehydrohalogenation of a halo-alkane-thiol wherein the halogen atom and thiol group are linked to vicinal carbon atoms to the corresponding alkylene sulphide while avoiding the substantial formation of alkylene sulphide polymers which comprises reacting the halo-alkane-thiol with a basic-acting agent which combines with the liberated hydrogen halide and maintains the pH of the reaction mixture in the range of from 5.5 to 11.5.

4. In a process for the production of an alkylene sulphide by reacting a halo-alkane-thiol wherein the halogen atom and thiol group are linked to vicinal carbon atoms with a basic-acting agent in an aqueous medium, the method of avoiding the substantial formation of alkylene sulphide polymers which comprises effecting the reaction in the presence of an alkaline buffing agent which combines with the liberated hydrogen halide and maintains the pH of the reaction mixture in the range of from 5.5 to 11.5.

WILLEM COLTOF.